United States Patent
Koga et al.

(10) Patent No.: US 9,083,194 B2
(45) Date of Patent: Jul. 14, 2015

(54) BATTERY CHARGING SYSTEM AND TRAIN

(75) Inventors: Takeru Koga, Tokyo (JP); Masayuki Nogi, Tokyo (JP); Hirotoshi Kawai, Tokyo (JP); Satoshi Koizumi, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 357 days.

(21) Appl. No.: 13/599,546

(22) Filed: Aug. 30, 2012

(65) Prior Publication Data
US 2013/0049458 A1  Feb. 28, 2013

(30) Foreign Application Priority Data
Aug. 31, 2011 (JP) ................................ P2011-189045

(51) Int. Cl.
*H02J 7/00* (2006.01)
*H02J 7/14* (2006.01)
*H02J 1/12* (2006.01)
(Continued)

(52) U.S. Cl.
CPC ................ *H02J 7/0054* (2013.01); *B60L 1/00* (2013.01); *B60L 9/00* (2013.01); *B60L 11/00* (2013.01); *B60L 2200/26* (2013.01); *B65G 1/00* (2013.01); *G03C 1/00* (2013.01); *H02J 1/12* (2013.01); *H02J 3/32* (2013.01); *H02J 7/00* (2013.01); *H02J 7/14* (2013.01)

(58) Field of Classification Search
CPC ................ H02J 7/00; H02J 7/14; H02J 1/12; H02J 3/32; H02J 91/00; H02J 7/0054; B65G 1/00; B65G 65/50; B61K 1/04; B60L 11/00; B60L 1/00; B60L 9/00; B60L 2200/26; G03C 1/00

USPC ............ 320/103, 104, 109, 135, 138; 307/46, 307/64, 66, 149; 104/34; 191/4; 340/636.2, 340/636.3, 636.4
See application file for complete search history.

(56) References Cited

U.S. PATENT DOCUMENTS 5,791,426 A * 8/1998 Yamada et al. ............ 180/65.24
5,844,342 A * 12/1998 Miyatani et al. ............... 310/114
(Continued)

FOREIGN PATENT DOCUMENTS

CN        101995881 A     3/2011
JP         09308104 A  * 11/1997 ................. H02J 1/00
(Continued)

OTHER PUBLICATIONS

Mizuno (English machine translation of Japanese Patent Document No. JP-2001095108A, published on Apr. 6, 2001, online machine translation at http://www.ipdl.inpit.go.jp/homepg_e.ipdl on Nov. 15, 2014, 22 pages).*

(Continued)

*Primary Examiner* — Phallaka Kik
(74) *Attorney, Agent, or Firm* — Holtz, Holtz, Goodman & Chick PC

(57) ABSTRACT

A battery charging system includes a first battery unit for storing electric power to be supplied to a driving system of a train, and a second battery unit for storing electric power to be supplied to the first battery unit. A control unit calculates electric power consumption from the first battery unit. And a battery charging unit supplies electric power to the first battery unit from the second battery unit based on the electric power consumption calculated by the control unit.

9 Claims, 3 Drawing Sheets

(51) Int. Cl.
   *H02J 3/32* (2006.01)
   *B65G 1/00* (2006.01)
   *B60L 11/00* (2006.01)
   *B60L 1/00* (2006.01)
   *B60L 9/00* (2006.01)
   *G03C 1/00* (2006.01)

(56) References Cited

U.S. PATENT DOCUMENTS

| | | | |
|---|---|---|---|
| 5,929,594 A * | 7/1999 | Nonobe et al. | 320/104 |
| 6,005,297 A * | 12/1999 | Sasaki et al. | 290/4 C |
| 6,727,809 B1 * | 4/2004 | Smith | 340/438 |
| 6,814,170 B2 * | 11/2004 | Abe et al. | 180/65.25 |
| 8,102,151 B2 * | 1/2012 | Lee | 320/133 |
| 8,380,999 B1 * | 2/2013 | Robison et al. | 713/300 |
| 8,909,399 B2 * | 12/2014 | Kato et al. | 701/22 |
| 8,933,587 B2 * | 1/2015 | Nikolov et al. | 307/66 |
| 2002/0017261 A1 * | 2/2002 | Kuroda et al. | 123/179.4 |
| 2002/0062183 A1 * | 5/2002 | Yamaguchi et al. | 701/22 |
| 2003/0116367 A1 * | 6/2003 | Kanno | 180/65.1 |
| 2003/0197484 A1 * | 10/2003 | Kotlow et al. | 320/104 |
| 2005/0103544 A1 * | 5/2005 | Takami et al. | 180/65.2 |
| 2006/0220405 A1 * | 10/2006 | Ohe et al. | 296/37.1 |
| 2007/0231626 A1 * | 10/2007 | Kurosawa | 429/13 |
| 2008/0224663 A1 * | 9/2008 | Mack | 320/132 |
| 2009/0051321 A1 * | 2/2009 | Sato | 320/132 |
| 2009/0167217 A1 | 7/2009 | Soma et al. | |
| 2010/0007307 A1 * | 1/2010 | Baarman et al. | 320/108 |
| 2010/0156352 A1 * | 6/2010 | Muta et al. | 320/134 |
| 2011/0000736 A1 * | 1/2011 | Oya | 180/443 |
| 2011/0031937 A1 * | 2/2011 | Bito | 320/150 |
| 2011/0056177 A1 * | 3/2011 | Goto | 56/14.7 |
| 2011/0260541 A1 * | 10/2011 | Huang et al. | 307/66 |
| 2014/0366501 A1 * | 12/2014 | Goto | 56/14.7 |

FOREIGN PATENT DOCUMENTS

| | | | | |
|---|---|---|---|---|
| JP | 2001095108 A * | 4/2001 | | B60L 11/18 |
| JP | 2001-352607 A | 12/2001 | | |
| JP | 2004064810 A * | 2/2004 | | H02J 3/32 |
| JP | 2009-72003 A | 4/2009 | | |

OTHER PUBLICATIONS

Chinese Office Action dated Apr. 30, 2014 in counterpart Chinese Application No. 201210315964.6.

* cited by examiner

BATTERY CHARGING SYSTEM AND TRAIN

CROSS-REFERENCE TO RELATED APPLICATIONS

This application is based upon and claims the benefit of priority from prior Japanese Patent Application No. 2011-189045, filed Aug. 31, 2011, the entire contents of which are incorporated herein by reference.

FIELD

Embodiments described herein especially relate to a battery charging system.

BACKGROUND

Conventional rail cars run by utilizing electric power supplied via an overhead line or a third rail. On the other hand, hybrid rail cars have been developed. The hybrid rail cars are equipped with battery units and use electric power from an overhead line and electric power stored in the battery units.

The hybrid rail cars run using the electric power from the overhead line when the hybrid rail cars run on a train line where the overhead line is placed. Meanwhile, the hybrid rail cars run using the electric power stored in the battery units where no overhead line is placed along the train line.

BRIEF SUMMARY OF THE INVENTION

It is an object of the present invention to provide a battery charging system for a train having batteries of different capacities, such that electric power stored in one of the batteries can always be kept at a suitable level for driving the train.

DETAILED DESCRIPTION

According to one embodiment, a battery charging system contains a first battery unit for storing electric power to be supplied to a driving system of a train, a second battery unit for storing electric power to be supplied to the first battery unit, a control unit for calculating electric power consumption from the first battery unit, and a battery charging unit for supplying electric power to the first battery unit from the second battery unit based on the electric power consumption calculated by the control unit.

Before explaining one embodiment of a battery charging system S1, a conventional battery charging system is explained with reference to FIGS. 5 and 6.

Figure 5:
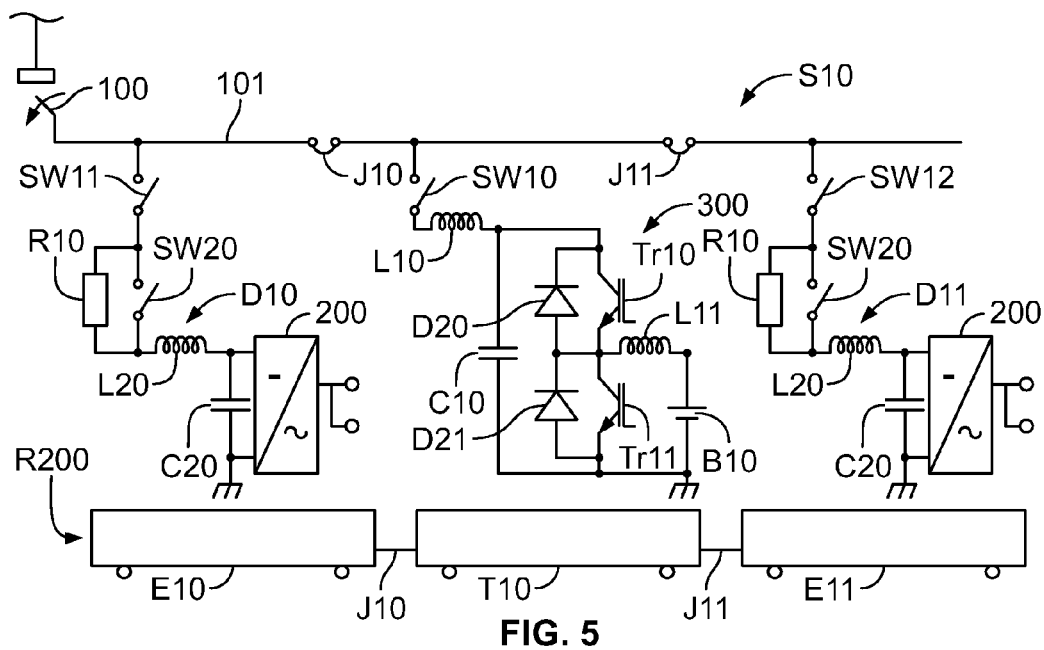
FIG. 5 is an example of a conventional battery charging system to be compared with a battery charging system of an embodiment.

FIG. 5 shows an example of the conventional battery charging system S10. In the battery charging system S10, a battery unit is charged rapidly while a train is stopped at a train station and electric power stored in the battery unit is used for operating rail cars.

As shown in FIG. 5, the battery charging system S10 of the train has a connector 100 attachable to and detachable from an external power source, a power line 101 that can connect to the external power source via the connector 100, a battery charging unit 300 for a charging battery unit B10, and driving circuits D10 and D11, which are switched on and off according to statuses of switches SW11 and SW12 respectively, for driving electric devices such as motors and so on. The battery unit B10 may be composed of Lithium-ion cells.

In this case, a train R200 is composed of two electric cars E10 and E11 with motors and a trailer car T10 on which the battery B10 is installed. The trailer car T10 is coupled between the electric cars E10 and E11.

Also, the electric car E10, the electric car E11, and the trailer car T10 are coupled by jumper couplers J10 and J11.

The battery charging unit 300 is connected to the power line 101 via the switch SW10.

As shown in FIG. 5, the battery charging unit 300 is composed of choke coils L10 and L11, capacitor C10, two diodes D20 and D21 connected in series, and transistors Tr10 and Tr11 for switching.

In addition, the diodes D20 and D21 and transistors Tr10 and Tr11 compose a step-down chopper circuit. The step-down chopper circuit steps down a voltage of a DC voltage supplied via the switch SW10 to a voltage suitable for charging the battery unit B10.

The driving circuits D10 and D11 are connected to the power line 101 via switches SW11 and SW12. In addition, since the driving circuit D10 and D11 have the same structure, the explanation will be given in relation to the driving circuit D10.

The driving circuit D10 is composed of a switch SW20 and resistor R10 connected in parallel, a choke coil L20 for regulating an AC component, a capacitor C20 for effectively smoothing a current, and an inverter 200, connected in parallel with the capacitor C20, for converting DC into AC.

In addition, input voltage can be regulated in accordance with on/off action of the switch SW20.

Here, functioning of the battery charging system S10 is described in brief.

When powering a train, the switches SW10, SW11, and SW12 are set ON so that a direct current from the battery B10 is supplied to the driving circuits D10 and D11.

The driving circuits D10 and D11 convert the direct current into a given alternating current, and drive a driving system such as 3-phase AC motors.

Meanwhile, the switches SW11 and SW12 are set OFF and the connector 100 is connected to a power source installed at a train station while the train stops at the train station. As a result, the battery unit B10 is charged rapidly via the battery charging unit 300.

Figure 6:
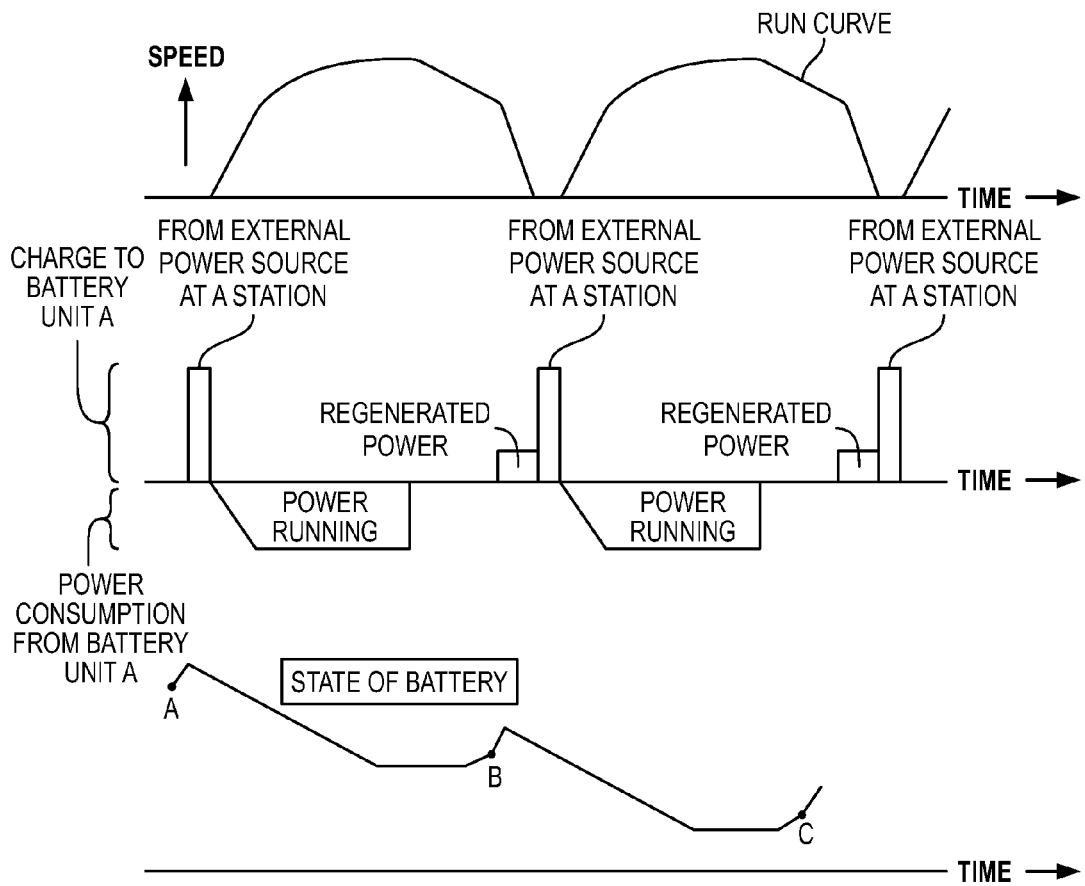
FIG. 6 is a graph showing a charging status of the conventional battery charging system.

FIG. 6 is a graph showing a charging status of the battery unit B10 controlled by the battery charging system S10.

As shown in FIG. 6, in the battery charging system S10, the battery unit B10 is charged under the control of the battery charging unit 300 while the train R200 is stopped at a station. However, the amount of consumption of electric power from the battery unit B10 while powering the train R200 exceeds the amount of electric power charged into the battery unit B10 by the regenerative brake system and a charging facility at a station. Therefore, remaining electric power stored in the battery unit B10 reduces as the train R200 repeats running and stopping at train stations as denoted by points A, B, and C in FIG. 6.

As a result, the battery unit B10 may become almost empty. When the battery unit B10 is charged when it is almost empty, battery life decreases.

Hereinafter, one embodiment of a battery charging system will be described with reference to the accompanying drawings.

FIGS. 1 through 4 show an example of a battery charging system S1 on a rail car.

Figure 1:
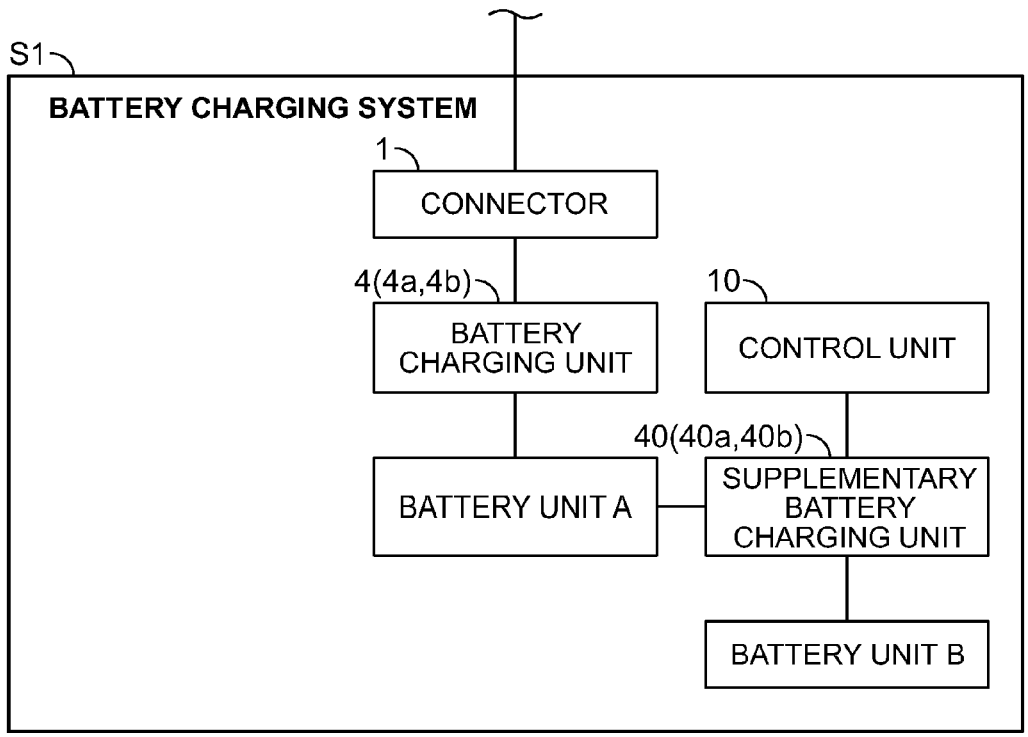
FIG. 1 shows a block diagram of a battery charging system of an embodiment.

As shown in FIG. 1, the battery charging system S1 includes a battery unit A with a given capacity, e.g. 300 kW/h, for supplying electric power to driving apparatuses such as motors and so on, a connector 1 for receiving electric power from an external electric source installed at a train station, a battery charging unit 4 (4a, 4b), connected to the connector 1, for charging the battery unit A while the train R100 is stopped at a train station, a battery unit B with large capacity, e.g. 500 kW/h, compared with the battery unit A, a control unit 10 (e.g., a CPU or processor) for performing arithmetic processing to calculate electric power consumption of the battery unit A while the train R100 is running, and a supplementary battery charging unit 40 (40a, 40b) for charging the battery unit A by supplying electric power stored in the battery unit B based on a result of the arithmetic processing performed by the control unit 10. The control unit 10 controls the actions of the units of the battery charging system S1, including supply of power to and from the battery unit A and battery unit B.

The battery charging unit 4 (4a, 4b) can have a supplementary function corresponding to the supplementary battery charging unit 40 (40a, 40b), so that the battery charging unit 4 (4a, 4b) can also act as the supplementary battery charging unit 40 (40a, 40b). In the embodiment explained here, the explanation is provided as the battery charging unit 4a includes the supplementary function.

Hereinafter, with reference to FIGS. 2 and 3, a detailed explanation regarding the battery charging system S1 will be provided.

Figure 2:
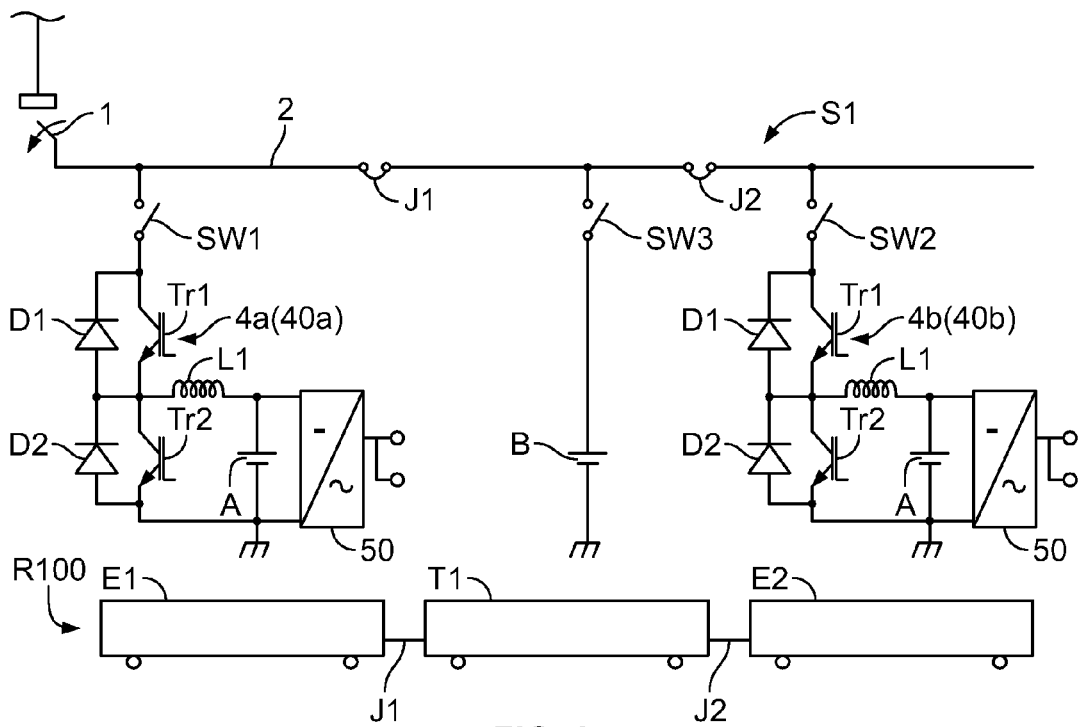
FIG. 2 shows an exemplary circuit contained in a battery charging system of an embodiment.
Figure 3:
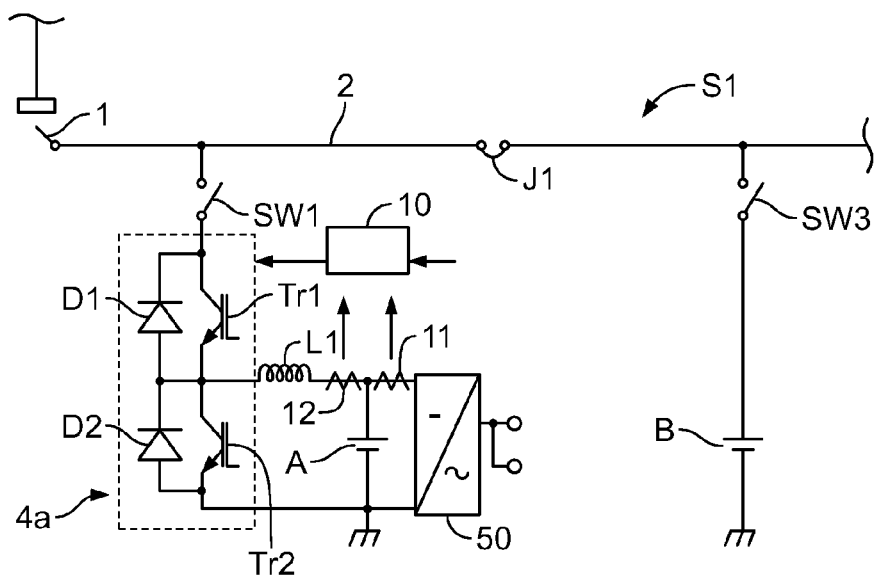
FIG. 3 shows a main part of a circuit contained in a battery charging system.

As shown in FIGS. 2 and 3, the battery charging system S1 on the train R100 has the connector 1 to be detachably connected to the external electric source, a power line 2 laid on the rail car, the battery charging unit 4 (4a, 4b) for charging the battery unit A, and on/off switches SW1, SW2, and SW3. The on/off switch SW1 is placed between the power line 2 and the battery charging unit 4a. The on/off switch SW2 is placed between the power line 2 and the battery charging unit 4b. And the on/off switch SW3 is placed between the power line 2 and the battery unit B.

In this embodiment, the train R100 is composed of two electric cars E1 and E2 equipped with driving motors, and a trailer car T1, equipped with the battery unit B, coupled between the electric car E1 and the electric car E2. In this embodiment, each of the electric cars E1 and E2 includes the battery charging unit 4 (in FIG. 2, battery charging unit 4a is on car E1, and battery charging unit 4b is on car E2), the battery unit A, and the control unit 10.

Also, the electric cars E1 and E2, and the trailer car T1 are connected via jumper couplers J1 and J2.

As described above, the train R100 includes multiple train cars. However, the train R100 can be composed of a single train car. In this case, the battery charging unit 4, the battery unit A, and the battery unit B and so on, contained in the battery charging system S1, are installed on the single train car.

Next, an explanation about the battery charging units 4a and 4b will be provided.

Since the battery charging units 4a and 4b have the same configuration, the explanation focuses on the battery charging unit 4a.

As shown in FIG. 3, the battery charging unit 4a is connected to the power line 2 via the switch SW1.

The battery charging unit 4a is composed of a choke coil L1, a diode D1 and a diode D2 connected in series, two transistors Tr1 and Tr2 to be used for switching, and an inverter unit 50 connected to the battery unit A in parallel.

The diodes D1 and D2, and the transistors Tr1 and Tr2 compose a step-down chopper circuit. The step-down chopper circuit lowers a voltage of a direct current received via the switch SW1 to a voltage suitable for charging the battery unit A.

The inverter unit 50 is connected to a 3-phase alternating-current motor and so on for driving the train R100.

As described above, the battery unit B is supplementarily used for charging the battery unit A. However, electric power stored in the battery unit B can be supplied to at least one of lighting equipment, air-conditioning equipment, and other electric equipment installed on the train R100.

The battery charging unit 4a controls charging to the battery unit A. Various charging techniques can be used. In one technique, the battery charging unit 4a controls charging so that a predetermined amount of electric power is charged into the battery unit A. The control unit 10 checks whether consumption of the electric power during running of the train R100 reaches the predetermined amount, and outputs notification information when it is determined that the predetermined amount of electric power has been consumed. When the battery charging unit 4a receives the notification information, the battery charging unit 4a charges the battery unit A with the electric power stored in the battery unit B. The charging can be performed so that the battery unit A is empty or nearly empty when the predetermined amount of electric power has been consumed. Other charging techniques are also possible as discussed below and will be apparent to those of skill in the art.

Also, the battery charging unit 4a is equipped with current detectors 11 and 12 for detecting a current to and from the battery unit A. Namely, a charging current to the battery unit A is measured by the current detector 11 and a discharging current from the battery unit A is measured by the current detector 12. The measured charging current value and the measured discharging current value are input to the control unit 10. The control unit 10 performs arithmetic processing in connection with the measured charging current value and the measured discharging current value according to orders for operating the train, such as a power running order generated at a master-controller of the train in accordance with a train operator's instructions to accelerate the train (for example), an electric power regeneration order generated at the master-controller of the train when the train operator activates regenerative braking (for example), and a battery charging order generated when the control unit 10 determines that the predetermined amount of electric power has been consumed. The control unit then outputs a control order to the battery charging unit 4a in accordance with the arithmetic processing.

The battery charging unit 4a has a function to charge the battery unit A with regenerated electric power by a motor when slowing down. The control unit 10 may be set to control the battery charging unit 4a so that the sum of the regenerated electric power charged to the battery unit A, the electric power charged to the battery unit A from the battery unit B, and the predetermined amount of electric power is equal to consumption of electric power at a driving motor.

Next, the operation of the battery charging system S1 will be provided.

When the train R100 starts running from a train station, the switches SW1, SW2, and SW3 are set to OFF, and the train R100 performs power running by using the electric power stored in the battery unit A.

Thereafter, when the train R100 stops at a train station, the connector 1 of the train R100 is connected to an external power source installed at the train station. After the connection of the connector 1 and the external power source is established, the switches SW1 and SW2 are set to ON, and then, based on the step-down chopper operation performed by the battery charging unit 4a, the battery unit A is charged with the electric power supplied from the external power source until the predetermined amount of electric power is charged to the battery unit A. (If the battery unity A is empty when the predetermined amount of electric power is consumed, then charging is performed until the predetermined amount of electric power is stored in the battery unit A). The battery unit B can be charged together with the battery unit A by setting the switch SW3 to ON when the train is stopped at a station. Also, the battery unit B can be charged in a similar manner when stopped at a car barn.

When it is time to run the train again, the connector 1 is disconnected from the external power source and the switches SW1 and SW2 are set to OFF. And again, the train R100 performs the power running by using the electric power stored in the battery unit A.

As described above, while the train is stopped at the train station, charging to the battery unit A is performed by the battery charging unit 4a. However, in some situations, more than the predetermined amount of electric power may be required before the train R100 arrives at the next train station. In this case, the control unit 10 detects the fact that the consumption of the electric power stored in the battery unit A has reached the predetermined amount of electric power, and accordingly the battery charging unit 4a charges the battery unit A with the electric power stored in the battery unit B by setting the switches SW1-SW3 to ON until an amount of electric power according to the consumption during the power running is charged to the battery unit A.

Thus, the electric power stored in the battery unit A can be kept to a suitable level for driving the train R100.

Also, the regenerated electric power generated while slowing down is supplied to the battery unit A.

When the train R100 is stopped at a train station, electric power is supplied to the battery unit A from an external power source such as an electric power substation. In this case, since sufficient electric power can be supplied to the battery unit A from the external power source, the predetermined amount of electric power is stored in the battery unit A.

Figure 4:
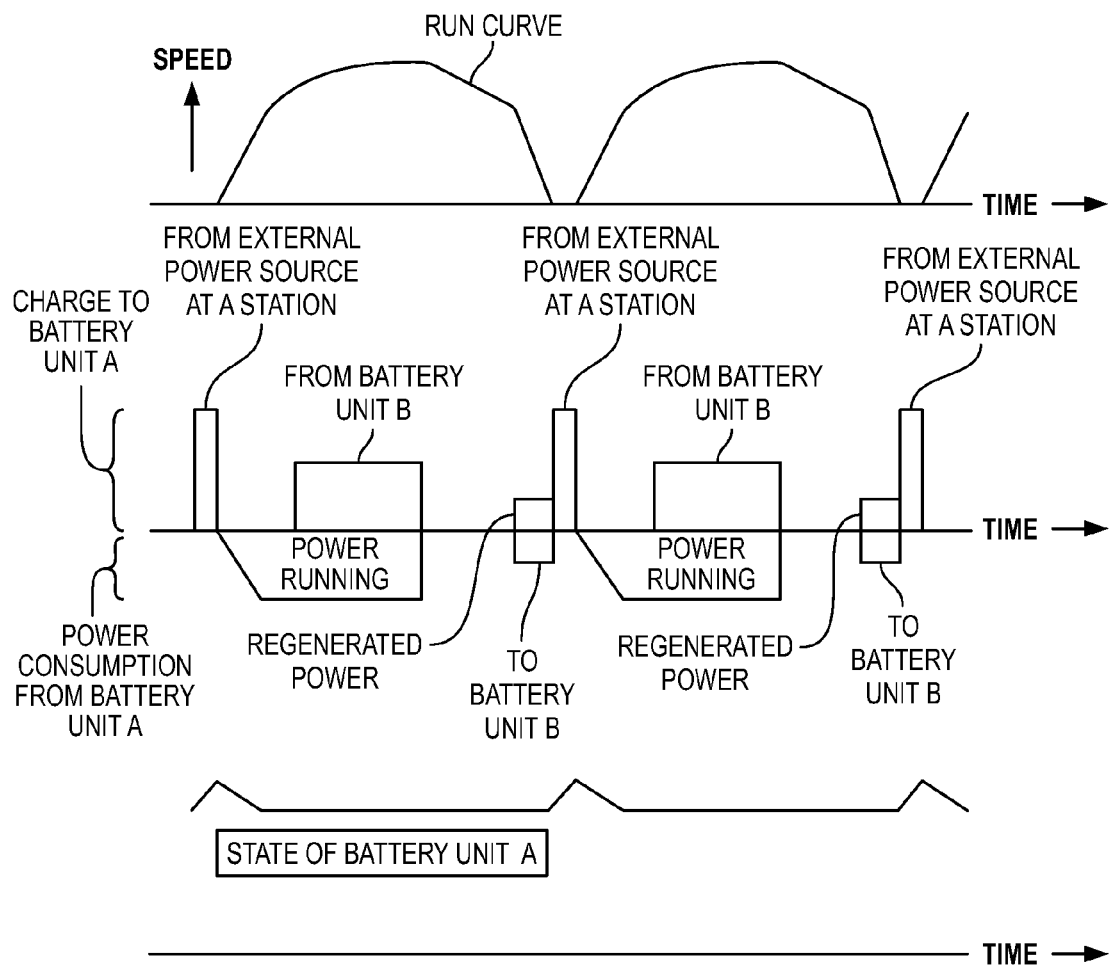
FIG. 4 is a graph showing a charging status of a battery unit of an embodiment.

It is clear from the comparison of the battery charging condition of the battery charging system S1 shown in FIG. 4 and the battery charging condition of the battery charging system S10 shown in FIG. 6 that the charging rate of the battery unit A corresponding to the battery charging system S1 is sustained in a more stable condition. In particular, the charging rate is kept high after the train repeatedly stops at stations and runs again.

As described above, according to the battery charging system S1, the electric power stored in the battery unit B is supplied to the battery unit A based on the result of arithmetic processing on the information of the power consumption of the battery unit A performed by the control unit 10. Consequently, the battery life can be extended since the charging rate of the battery unit A is kept relatively high while running.

Also, since the discharge of the battery unit B is relatively slow, the battery life of the battery unit B also can be extended.

Also, when the control unit 10 detects that the consumption amount from the battery unit A reaches the predetermined amount of electric power, the electric power stored in the battery unit B is supplementarily supplied to the battery unit A. Consequently, since relatively a high charging rate of the battery unit A of the train R100 is readily kept, the battery life of the battery unit A can be extended more and more.

Furthermore, in a case that the battery unit 4a is set so that the sum of the regenerated electric power charged to the battery unit A, the electric power supplementarily charged to the battery unit A from the battery unit B, and the predetermined amount of electric power is equal to the consumption of the electric power at the driving system, the battery unit A and so on can be designed to have the minimum ability necessary to drive the train R100. Since the battery A can thereby be downsized, the battery unit A can be smoothly rigged to the train R100.

The charging technique described above is not the only one that can be used. For example, in another charging technique, the battery charging unit 4a controls charging so that an amount of electric power charged in the battery unit A reaches a first predetermined amount. The control unit 10 checks whether consumption of the electric power during running of the train R100 causes the amount of power charged in the battery unit A to fall to a second predetermined amount that is lower than the first predetermined amount, and outputs notification information when the second predetermined amount of electric power is reached. When the battery charging unit 4a receives the notification information, the battery charging unit 4a charges the battery unit A with the electric power stored in the battery unit B.

Obviously, numerous other modifications and variations of the present embodiment are possible in light of the above teachings. It is therefore to be understood that within the scope of the appended claims, the embodiment may be practiced otherwise than as specifically described herein.

What is claimed is:

1. A battery charging system, comprising:
   a connector for connecting to an external power source so as to receive electric power;
   a first battery unit for storing electric power to be supplied to a driving system of a train;
   a second battery unit for storing electric power to be supplied to the first battery unit;
   a control unit for calculating electric power consumption from the first battery unit; and
   a battery charging unit for supplying electric power to the first battery unit;
   wherein the control unit controls the battery charging unit to supply a predetermined amount of electric power from the external power source to the first battery unit when the connector establishes a connection to the external power source; and
   wherein the control unit controls the battery charging unit to supply the electric power to the first battery unit from the second battery unit when the control unit determines that the first battery unit has consumed a predetermined amount of electric power.

2. The battery charging system according to claim 1, wherein the control unit controls the battery charging unit to supply electric power regenerated by a motor while slowing down, to the first battery unit.

3. The battery charging system according to claim 1, wherein the control unit controls the second battery unit to supply the electric power stored in the second battery unit to electric equipment installed on the train.

4. The battery charging system according to claim 1, wherein a capacity of the second battery is greater than a capacity of the first battery.

5. A train, comprising:
a motor for driving the train;
a connector for connecting to an external power source so as to receive electric power;
a first battery unit for storing electric power to be supplied to the motor;
a second battery unit for storing electric power to be supplied to the first battery unit;
a control unit for calculating electric power consumption from the first battery unit; and
a battery charging unit for supplying electric power to the first battery unit;
wherein the control unit controls the battery charging unit to supply a predetermined amount of electric power from the external power source to the first battery unit when the connector establishes a connection to the external power source; and
wherein the control unit controls the battery charging unit to supply the electric power to the first battery unit from the second battery unit when the control unit determines that the first battery unit has consumed a predetermined amount of electric power.

6. The train according to claim 5, wherein the control unit controls the battery charging unit to supply electric power regenerated by the motor while slowing down, to the first battery unit.

7. The train according to claim 5, wherein the control unit controls the second battery unit to supply the electric power stored in the second battery unit to electric equipment installed on the train.

8. The train according to claim 5, wherein the train comprises at least a first car and a second car; and
wherein the first car includes the motor, the first battery unit, the control unit, and the battery charging unit, and the second car includes the second battery unit.

9. The train according to claim 5, wherein a capacity of the second battery is greater than a capacity of the first battery.

* * * * *